(12) United States Patent
Kim et al.

(10) Patent No.: US 7,564,760 B2
(45) Date of Patent: Jul. 21, 2009

(54) RECORDING MEDIUM, METHOD OF CONFIGURING DISC CONTROL INFORMATION THEREOF, RECORDING AND REPRODUCING METHOD USING THE SAME, AND APPARATUS THEREOF

(75) Inventors: Jin Yong Kim, Seongnam-si (KR); Sang Woon Suh, Seoul (KR)

(73) Assignee: LG Electronics, Inc., Seoul (KR)

( * ) Notice: Subject to any disclaimer, the term of this patent is extended or adjusted under 35 U.S.C. 154(b) by 488 days.

(21) Appl. No.: 10/880,663

(22) Filed: Jul. 1, 2004

(65) Prior Publication Data

US 2005/0007917 A1   Jan. 13, 2005

(30) Foreign Application Priority Data

| Jul. 9, 2003 | (KR) | 10-2003-0046420 |
| Sep. 9, 2003 | (KR) | 10-2003-0063271 |
| Sep. 15, 2003 | (KR) | 10-2003-0063591 |
| Sep. 22, 2003 | (KR) | 10-2003-0065628 |

(51) Int. Cl.
G11B 7/013   (2006.01)

(52) U.S. Cl. ............. 369/59.25; 369/275.3; 369/59.11; 369/47.51

(58) Field of Classification Search ............. 369/59.25, 369/47.36, 47.27, 47.38, 189, 275.3, 59.11, 369/47.51
See application file for complete search history.

(56) References Cited

U.S. PATENT DOCUMENTS

| 5,361,173 A | 11/1994 | Ishii et al. |
| 5,485,469 A | 1/1996 | Suzuki |
| 5,590,096 A | 12/1996 | Ohtsuka et al. |
| 5,636,631 A | 6/1997 | Waitz et al. |
| 5,764,621 A | 6/1998 | Choi |
| 5,793,546 A | 8/1998 | Tanaka |
| 5,835,462 A | 11/1998 | Mimnagh |
| 5,892,633 A | 4/1999 | Ayres et al. |
| 5,959,962 A | 9/1999 | Matsumaru et al. |
| 6,415,435 B1 | 7/2002 | McIntyre |

(Continued)

FOREIGN PATENT DOCUMENTS

CN   1151071   6/1997

(Continued)

OTHER PUBLICATIONS

International Search Report issued Sep. 16, 2004 in corresponding International Patent Application No. PCT/KR2004/001624.

(Continued)

*Primary Examiner*—Wayne R Young
*Assistant Examiner*—Thomas D Alunkal
(74) *Attorney, Agent, or Firm*—Harness, Dickey & Pierce, P.L.C.

(57) ABSTRACT

In a recordable optical disc including at least one recording layer, writing speed information and per writing speed write strategy information are recorded within disc control information, so that standardized disc control information can be uniformly applied to data recording and reproduction. At least one disc control information is recorded within the management area in per applicable writing speed order, and at least one disc information is recorded within a same writing speed in per recording layer order.

43 Claims, 15 Drawing Sheets

U.S. PATENT DOCUMENTS

| | | | |
|---|---|---|---|
| 6,480,450 B1 | 11/2002 | Fujii et al. | |
| 6,487,713 B1 | 11/2002 | Cohen et al. | |
| 6,504,806 B1* | 1/2003 | Nakajo | 369/59.12 |
| 6,535,470 B1 | 3/2003 | Wu | |
| 6,580,671 B1 | 6/2003 | Otomo et al. | |
| 6,643,233 B1 | 11/2003 | Yen et al. | |
| 6,684,328 B2 | 1/2004 | Matsuura | |
| 6,868,054 B1 | 3/2005 | Ko | |
| 6,891,786 B2* | 5/2005 | Sato | 369/47.53 |
| 6,894,961 B1 | 5/2005 | Osakabe | |
| 6,996,047 B2 | 2/2006 | Nagano | |
| 6,999,393 B2 | 2/2006 | Yamada | |
| 7,012,878 B2 | 3/2006 | Shinotsuka et al. | |
| 7,075,871 B2 | 7/2006 | Kato et al. | |
| 7,088,667 B2 | 8/2006 | Kobayashi | |
| 7,161,881 B2 | 1/2007 | Pereira | |
| 7,170,841 B2* | 1/2007 | Shoji et al. | 369/59.25 |
| 7,193,948 B2 | 3/2007 | Furukawa et al. | |
| 7,212,480 B2 | 5/2007 | Shoji et al. | |
| 7,218,585 B2 | 5/2007 | Tanii et al. | |
| 7,230,907 B2 | 6/2007 | Shoji et al. | |
| 7,286,455 B2 | 10/2007 | Shoji et al. | |
| 7,304,938 B2 | 12/2007 | Hwang et al. | |
| 7,345,970 B2 | 3/2008 | Kim et al. | |
| 7,369,475 B2 | 5/2008 | Nagai | |
| 7,376,072 B2 | 5/2008 | Shoji et al. | |
| 7,400,571 B2 | 7/2008 | Shoji et al. | |
| 7,414,936 B2 | 8/2008 | Tasaka et al. | |
| 7,423,951 B2 | 9/2008 | Shoji et al. | |
| 7,471,879 B2 | 12/2008 | Fuchigami et al. | |
| 2001/0044935 A1 | 11/2001 | Kitayama | |
| 2001/0053114 A1* | 12/2001 | Miyake et al. | 369/47.55 |
| 2001/0053115 A1 | 12/2001 | Nobukuni et al. | |
| 2002/0021656 A1* | 2/2002 | Tsukagoshi et al. | 369/275.3 |
| 2002/0044509 A1 | 4/2002 | Nakajima | |
| 2002/0048241 A1 | 4/2002 | Kumagai et al. | |
| 2002/0048646 A1 | 4/2002 | Tomura et al. | |
| 2002/0085470 A1 | 7/2002 | Yokoi | |
| 2002/0089914 A1* | 7/2002 | Nakajo | 369/59.12 |
| 2002/0126604 A1 | 9/2002 | Powelson et al. | |
| 2002/0126611 A1 | 9/2002 | Chang | |
| 2002/0159352 A1 | 10/2002 | Yamada | |
| 2002/0167880 A1 | 11/2002 | Ando et al. | |
| 2003/0021201 A1* | 1/2003 | Kobayashi | 369/47.39 |
| 2003/0021202 A1 | 1/2003 | Usui et al. | |
| 2003/0039187 A1 | 2/2003 | Geutskens | |
| 2003/0048241 A1 | 3/2003 | Shin et al. | |
| 2003/0058771 A1 | 3/2003 | Furukawa et al. | |
| 2003/0072251 A1* | 4/2003 | Kondo | 369/275.3 |
| 2003/0076775 A1 | 4/2003 | Sato et al. | |
| 2003/0086345 A1 | 5/2003 | Ueki et al. | |
| 2003/0086346 A1 | 5/2003 | Fukumoto | |
| 2003/0137915 A1 | 7/2003 | Shoji et al. | |
| 2003/0151994 A1* | 8/2003 | Tasaka et al. | 369/47.53 |
| 2003/0159135 A1 | 8/2003 | Hiller et al. | |
| 2003/0223339 A1 | 12/2003 | Taniguchi et al. | |
| 2003/0231567 A1 | 12/2003 | Moritomo et al. | |
| 2003/0237024 A1 | 12/2003 | Ogawa et al. | |
| 2004/0001407 A1 | 1/2004 | Kim et al. | |
| 2004/0004921 A1 | 1/2004 | Lee et al. | |
| 2004/0010745 A1* | 1/2004 | Lee et al. | 714/769 |
| 2004/0013074 A1 | 1/2004 | Lee et al. | |
| 2004/0022150 A1* | 2/2004 | Lee et al. | 369/47.39 |
| 2004/0030962 A1 | 2/2004 | Swaine et al. | |
| 2004/0062160 A1 | 4/2004 | Park et al. | |
| 2004/0076096 A1 | 4/2004 | Hwang et al. | |
| 2004/0090888 A1 | 5/2004 | Park et al. | |
| 2004/0114474 A1 | 6/2004 | Park et al. | |
| 2004/0125717 A1 | 7/2004 | Ko et al. | |
| 2004/0145980 A1 | 7/2004 | Park et al. | |
| 2004/0184395 A1 | 9/2004 | Lee et al. | |
| 2004/0223434 A1 | 11/2004 | Nishimura et al. | |
| 2005/0019023 A1 | 1/2005 | Ko | |
| 2005/0030853 A1* | 2/2005 | Lee et al. | 369/47.22 |
| 2005/0036425 A1 | 2/2005 | Suh et al. | |
| 2005/0038957 A1 | 2/2005 | Suh | |
| 2006/0233059 A1 | 10/2006 | Suh et al. | |
| 2007/0088954 A1 | 4/2007 | Furukawa et al. | |
| 2008/0043588 A1 | 2/2008 | Suh et al. | |

FOREIGN PATENT DOCUMENTS

| | | |
|---|---|---|
| CN | 1400588 | 3/2003 |
| CN | 1656544 | 8/2005 |
| EP | 0 265 984 | 5/1988 |
| EP | 0 552 903 | 7/1993 |
| EP | 0 968 769 A2 | 1/2000 |
| EP | 968769 | 1/2000 |
| EP | 1 128 383 | 8/2001 |
| EP | 1 172 810 A2 | 1/2002 |
| EP | 1 244 097 | 6/2002 |
| EP | 1298659 | 4/2003 |
| EP | 1 308 942 | 5/2003 |
| EP | 1 331 631 A1 | 7/2003 |
| EP | 1329888 | 7/2003 |
| EP | 1 361 571 | 11/2003 |
| EP | 1 369 850 | 12/2003 |
| EP | 1 471 506 | 10/2004 |
| EP | 1 522 994 | 4/2005 |
| EP | 1 605 445 A2 | 12/2005 |
| JP | 6-309802 | 11/1994 |
| JP | 9-128899 | 5/1997 |
| JP | 09-134525 | 5/1997 |
| JP | 09-160761 | 6/1997 |
| JP | 11-085413 | 3/1999 |
| JP | 2000-113458 | 4/2000 |
| JP | 2002-352430 | 12/2001 |
| JP | 2002-050053 | 2/2002 |
| JP | 2002-230764 | 8/2002 |
| JP | 2002-245625 | 8/2002 |
| JP | 2002-352435 | 12/2002 |
| JP | 2003-006860 | 1/2003 |
| JP | 2003-045036 | 2/2003 |
| JP | 2003-203341 | 7/2003 |
| JP | 2003-257026 | 9/2003 |
| WO | WO 97/13244 | 4/1997 |
| WO | WO 00/79525 | 12/2000 |
| WO | WO 02/17308 | 2/2002 |
| WO | WO 02/29791 A1 | 4/2002 |
| WO | WO 02/065462 | 8/2002 |
| WO | WO 02/086887 | 10/2002 |
| WO | WO 02/086888 | 10/2002 |
| WO | WO 02/089123 | 11/2002 |
| WO | WO 03/010519 | 2/2003 |
| WO | WO 03/025935 | 3/2003 |
| WO | WO 03/067581 | 8/2003 |
| WO | WO 03/075265 | 9/2003 |
| WO | WO 03/105139 | 12/2003 |
| WO | WO 2004/013845 A1 | 2/2004 |
| WO | WO 2004/015707 | 2/2004 |
| WO | WO 2004/072966 | 8/2004 |
| WO | WO 2005/001819 A1 | 1/2005 |

OTHER PUBLICATIONS

Communication issued by European Patent Office on May 30, 2007 in counterpart EP App. No. 04 748 381.3.

Communication issued by European Patent Office on Jun. 1, 2007 in counterpart EP App. No. 07104646.0.

Communication issued by European Patent Office on Jun. 1, 2007 in counterpart EP App. No. 07104648.6.

Japanese Office Action issued in corresponding application dated Oct. 5, 2007.

Search Report for corresponding European application dated Apr. 15, 2008.

Office Action for corresponding Russian application dated Jun. 23, 2008.

Search Report dated Jul. 2, 2008 by European Patent Office for a counterpart European application.

European Search Report dated Mar. 27, 2009.

Office Action for corresponding Japanese application No. 2006-180280 dated Jan. 6, 2009.

Office Action for corresponding Japanese application No. 2006-187883 dated Dec. 26, 2008.

Office Action for corresponding Chinese Application No. 200710127832 dated Dec. 5, 2008.

Japanese Office Action dated Mar. 17, 2009 for corresponding Japanese Application No. 2006-523136.

* cited by examiner

FIG. 4

| Byte number | contents | Number of bytes |
|---|---|---|
| 0 | Disc Information identifier = "DI" | 2 |
| ... | ... | |
| 5 | DI frame sequence number in DI block | 1 |
| ... | ... | |
| 44 to 111 | Write strategy parameters | 64 |

Disc Information (112 bytes)

PIC 1 cluster

| | |
|---|---|
| "00h" | 1'st DI (1X L0) |
| "01h" | 2'nd DI (1X L1) |
| "02h" | 3'rd DI (1X L2) |
| "03h" | 4'th DI (1X L3) |
| "04h" | 5'th DI (2X L0) |
| "05h" | 6'th DI (2X L1) |
| "06h" | 7'th DI (2X L2) |
| "07h" | 8'th DI (2X L3) |
| "08h" | 9'th DI (4X L0) |
| "09h" | 10'th DI (4X L1) |
| "10h" | 11'th DI (4X L2) |
| "11h" | 12'th DI (4X L3) |
| "12h" | 13'th DI (6X L0) |
| "13h" | 14'th DI (6X L1) |
| "14h" | 15'th DI (6X L2) |
| "15h" | 16'th DI (6X L3) |

FIG. 5B

| | PIC 1 cluster |
|---|---|
| "00h" | 1'st DI (1X L0) |
| "01h" | 2'nd DI (1X L1) |
| "02h" | 3'rd DI (2X L0) |
| "03h" | 4'th DI (2X L1) |
| "04h" | 5'th DI (4X L0) |
| "05h" | 6'th DI (4X L1) |
| "06h" | 7'th DI (6X L0) |
| "07h" | 8'th DI (6X L1) |

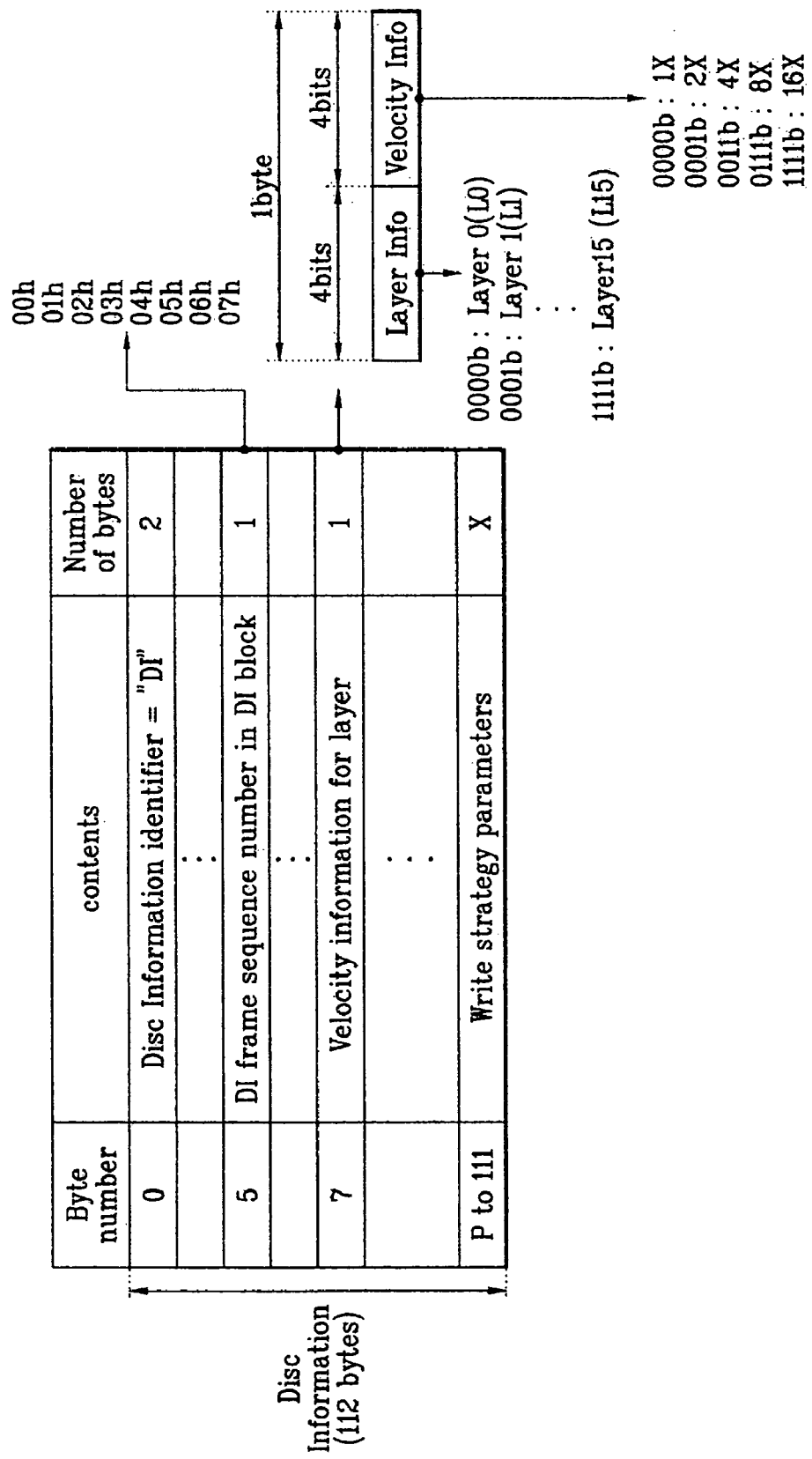

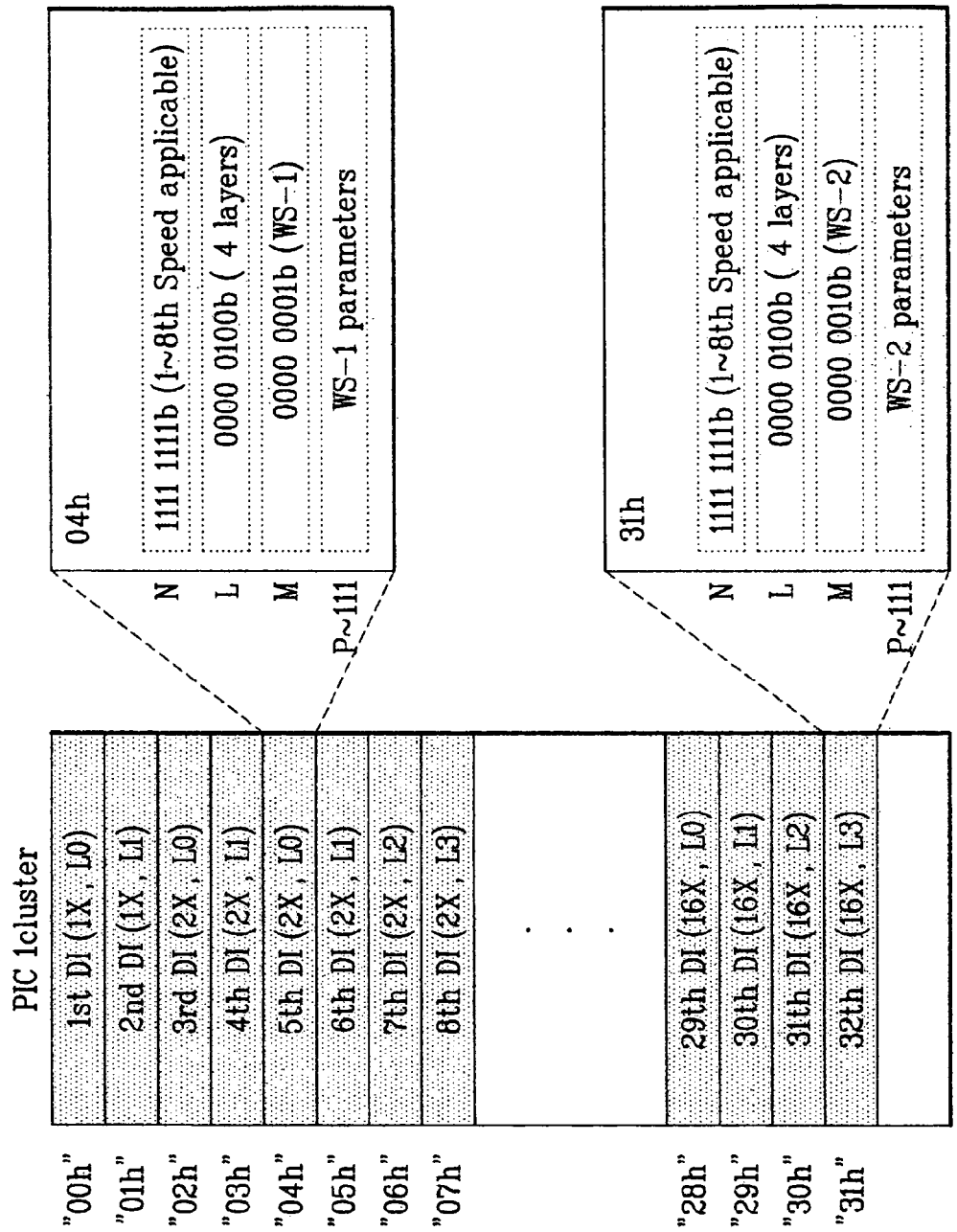

| b7 | b6 | b5 | b4 | b3 | b2 | b1 | b0 |
|---|---|---|---|---|---|---|---|
| 8th X | 7th X | 6th X | 5th X | 4th X | 3rd X | 2 X | 1 X |
| 0b | 0b | 0b | 0b | 0b | 0b | 1b | 1b |

0b : this speed is not applicable
1b : this speed is applicable

| b7 | b6 | b5 | b4 | b3 | b2 | b1 | b0 |
|---|---|---|---|---|---|---|---|
| WS8 | WS7 | WS6 | WS5 | WS4 | WS3 | WS2 | WS1 |
| 0b | 0b | 0b | 0b | 1b | 1b | 1b | 1b |

0b : this WS-type is not applicable
1b : this WS-type is applicable

Disc Information (112 bytes)

| Byte number | contents | Number of bytes |
|---|---|---|
| 0 | Disc Information identifier = "DI" | 2 |
| 5 | DI frame sequence number in DI block | 1 |
| ... | ... | ... |
| N | Writing speed flag (= 0000 0111b) | 1 |
| L | Write Stategy (WS) flag (= 0000 1111b) | 1 |
| M | Number of Recording Layer (= 0000 0010b : 2 layers) | 1 |
| P∼111 | Write strategy (WS) parameters | X |

RECORDING MEDIUM, METHOD OF CONFIGURING DISC CONTROL INFORMATION THEREOF, RECORDING AND REPRODUCING METHOD USING THE SAME, AND APPARATUS THEREOF

This application claims the benefit of the Korean Application No. 10-2003-0046420 filed on Jul. 9, 2003, No. 10-2003-0063271 filed on Sep. 9, 2003, No. 10-2003-0063591 filed on Sep. 15, 2003, and No. 10-2003-0065628 filed on Sep. 22, 2003, which are hereby incorporated by reference.

BACKGROUND OF THE INVENTION

1. Field of the Invention

The present invention relates to recording media, and more particularly, to a method of recording disc control information on a recordable optical disc including at least one recording layer, in which writing speed information and per writing speed write strategy information (write strategy parameters) are included within the recorded disc control information, and to method of recording data using the disc control information recorded in a specific area of the recordable optical disc.

2. Discussion of the Related Art

A high density optical recording medium, known as HD-DVD, is widely used to record and store high-definition video data, large-amount program data, and high-quality audio data and so on. The Blu-ray disc represents next-generation HD-DVD technology. Technological specifications are now being established for the global standardization of the Blu-ray disc, including standards for the write once Blu-ray disc (BD-WO). Meanwhile, a rewritable Blu-ray disc, known as the 1x-speed BD-RE and now being discussed, should be compatible with BD-RE discs expected to have higher writing speeds, i.e., the 2x-speed BD-RE and beyond. BD-WO specifications for high writing speed are also in progress. Efficient solutions for coping with the high writing speed of a high-density optical disc are Urgently needed, and the specifications established should ensure mutual compatibility.

SUMMARY OF THE INVENTION

Accordingly, the present invention is directed to a disc control information recording method that substantially obviates one or more problems due to limitations and disadvantages of the related art.

An object of the present invention is to provide a method of recording disc control information corresponding to high writing speed, by which writing speed information is included within disc control information prerecorded on a recording medium and by which recording on and reproducing from the recording medium can be performed based on recorded disc information Another object of the present invention is to provide a data structure for configuring disc control information.

Another object of the present invention is to provide a method of recording disc control information coping with high writing speed in a specific area within a disc, by which information for per recording layer specific writing speed is provided in a specific sequence, to achieve compatibility between like-based recording media.

Another object of the present invention is to provide a recording medium, recording and reproducing method, and apparatus suitable for use with the above disc control information recording methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording control information on a recording medium including at least one recording layer according to the present invention includes the steps of generating a control information including each information unit for a plurality of writing speeds to be used for a specific recording layer and recording each information unit in sequential order according to an increasing writing speeds in a specific area of the recording medium.

In another aspect of the present invention, a data structure of a control information for use with a recording medium is characterized in that the recording medium comprises at least one recording layer, the control information includes a plurality of information units having a sequential order, according to an increasing writing speeds, and according to layer numbers within the same writing speed.

In another aspect of the present invention, a recording medium having at least one recording layer provided with a recordable area and a control data area, is characterized in that disc information unit is provided within the control data area and wherein the disc information unit is provided in a specific order within the control data area by being firstly arranged in a writing speed order and being secondly arranged in a recording layer order within a same writing speed.

In another aspect of the present invention, an optical disc recording method includes the steps of reading control information recorded on a specific area of the recording medium, the control information includes a plurality of information units having a sequential order, according to an increased writing speeds, and according to layer numbers within the same writing speed and recording data on a specific recording layer at a specific writing speed based on information included in at least one information unit.

In another aspect of the present invention, a method for recording data on a recording medium includes steps of determining a specific write speed and write strategy for a recording layer from a control information, the control information including a plurality of information units having a sequential order according to an increased writing speeds and according to layer numbers within the same writing speed; and recording data on the recording layer at the specific writing speed and write strategy using write parameters included in information unit for the specific write speed and write strategy.

In another aspect of the present invention, a method for recording data on a recording medium includes steps of reading a control information including a respective information units for a plurality of writing speeds to be used for a specific recording layer, each information unit in sequential order according to an increasing writing speeds in a specific area of the recording medium, from a specific area of the recording medium and recording data at specific recording layer based on at least one information unit.

In another aspect of the present invention, an apparatus for recording or reproducing data on or from a recording medium includes a controller for generating a recording command, and a recorder/reproducer for performing a recording, based on the generated recording command, by reading a plurality of disc control informations written within a management area of an optical disc and reading a write strategy within each of a plurality of the disc control informations, wherein a plurality of the disc control informations are preferentially arranged in a writing speed order and then arranged in a recording layer order within a same writing speed In another aspect of the present invention, an apparatus for recording or reproducing data on or from a recording medium includes an optical pickup to record or read data on or from the recording medium, and a controller to control a recording or reproducing of data based on a control information read from the optical pickup, the control information including a respective information units for a plurality of writing speeds to be used for a specific recording layer, each information unit in sequential order according to an increasing writing speeds in a specific area of the recording medium, from a specific area of the recording medium, the controller to control the recording based on information included in a specific information unit.

In another aspect of the present invention, an apparatus for recording or reproducing data on or from a recording medium includes an optical pickup to record or read data on or from the recording medium, and a controller to determine a specific write speed and write strategy for a recording layer from a control information read from the optical pickup, the control information including a plurality of information units having a sequential order according to an increased writing speeds and according to layer numbers within the same writing speed, and to control a recording of data based on at least one information unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram of a sample data structure of disc control information recorded according to a first embodiment of the present invention;

FIGS. 5A and 5B are diagrams of a sample configuration sequence of the disc control information recorded according to the first embodiment of the present invention;

FIGS. 6A and 6B are exemplary diagrams of recording the disc control information according to the first embodiment of the present invention;

FIGS. 7A-7C are other exemplary diagrams of recording the disc information according to the first embodiment of the present invention;

FIGS. 9A and 9B are exemplary diagrams of a configuration sequence of the disc control information recorded according to the second embodiment of present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/-RW/+RW/-R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc control information' in the description of the present invention means an area including various information for disc record playback or information for disc record playback. And, the disc control information is commonly designated information provided to a prerecorded area within a disc or to an embossed area for a disc user by a disc manufacturer. Yet, the disc control information is provided not only to the prerecorded area but also to a recordable area. The disc information within the prerecorded or embossed area can be copied to the recordable area as well. And, they are just exemplary.

For instance, the disc control information is called 'disc information' in BD or 'physical format information' in DVD-RAM/-RW/+RW/-R/+R. Hence, it is apparent that the technical background of the present invention is identically applicable to 'physical format information' in DVD-RAM/-RW/+RW/-R/+R. For convenience of explanation, 'disc information (hereinafter abbreviated DI)' corresponding to a case of Blu-ray disc (BD) is taken as an example.

Figure 1:
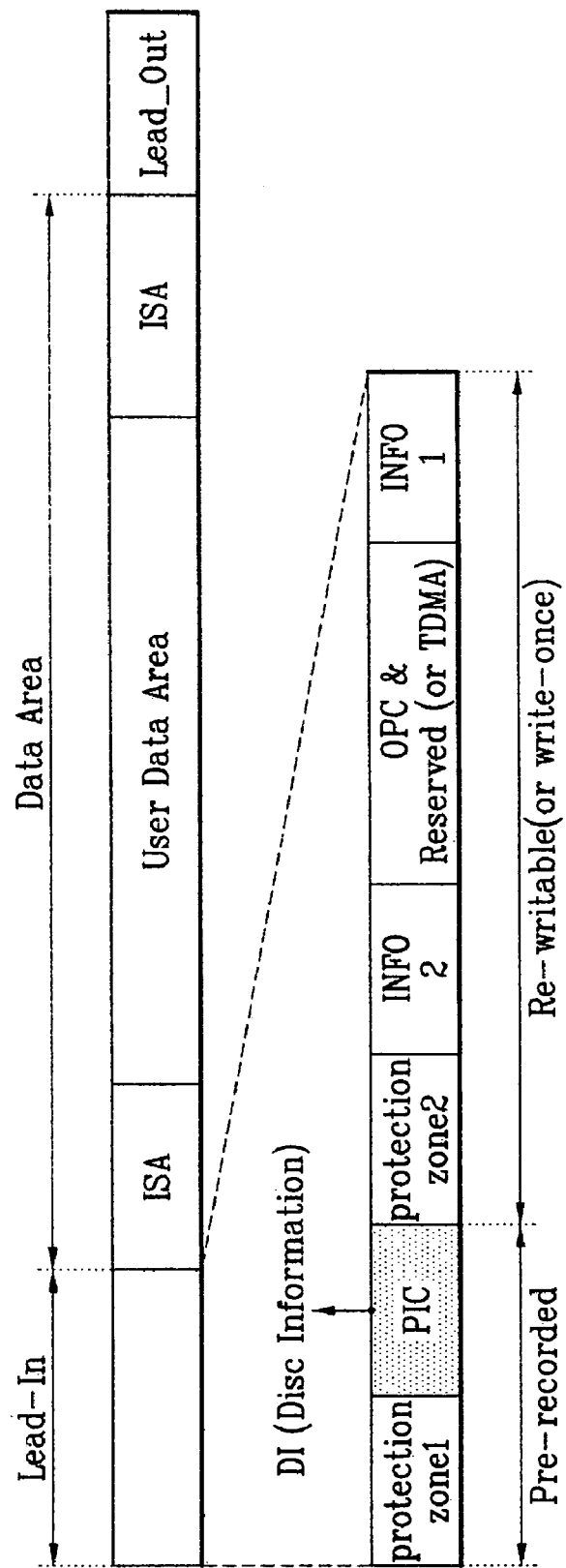
FIG. 1 is a diagram of a single-layer disc applicable to the present invention.
Figure 2:
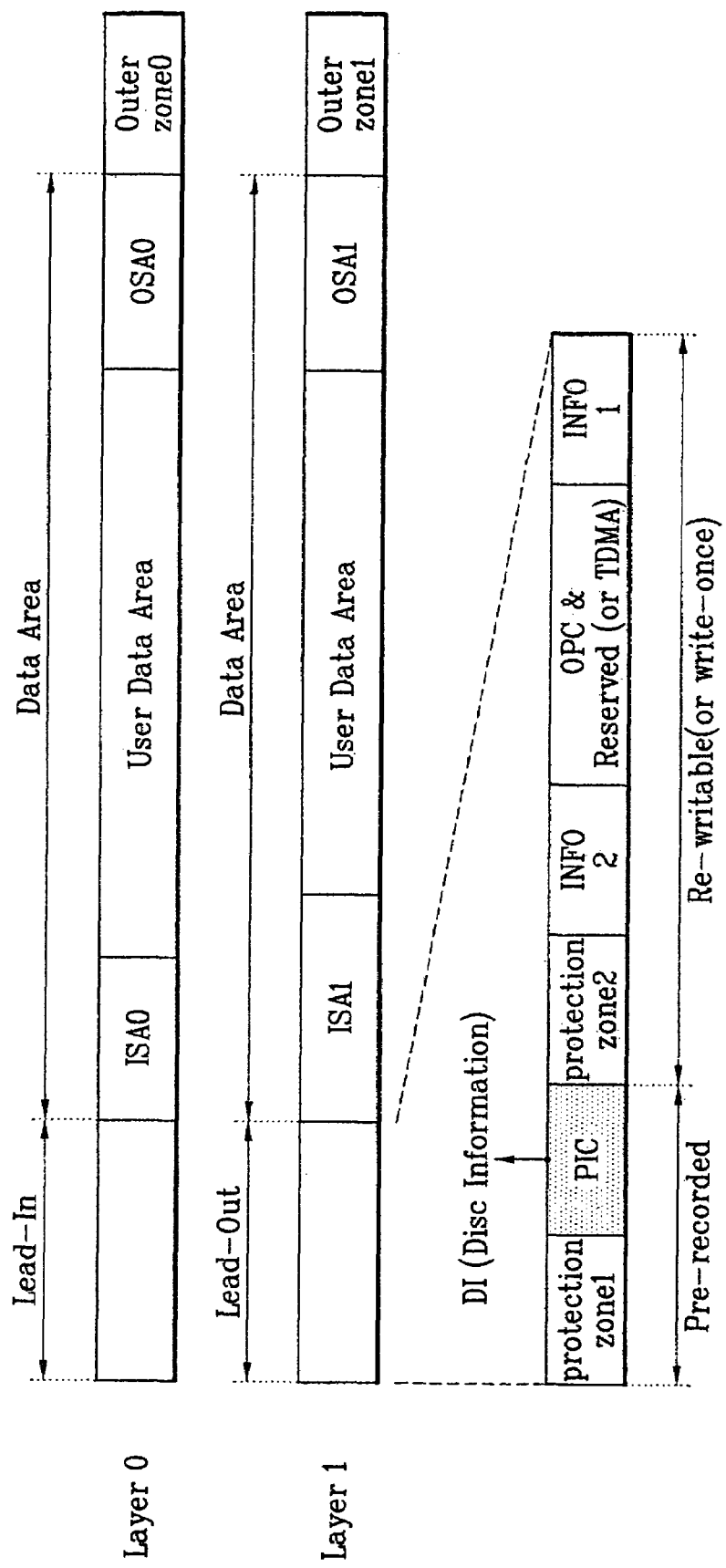
FIG. 2 is a diagram of a dual-layer disc applicable to the present invention.

FIG. 1 and FIG. 2 are structural diagrams of optical discs according to the present invention, in which a recordable optical disc is enough to be the optical disc applicable to the present invention. Moreover, the recordable disc can be any one of a rewritable optical disc, a write-once optical disc, and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, a prerecorded area and a rewritable or write-once area are separated from each other within the inner circumference area of the disc.

The prerecorded area is an area (called 'embossed area') where data was already written in manufacturing the disc, whereby a user or system is unable to perform data writing on the prerecorded area at all. In BD-RE/WO, the prerecorded area is named PIC (permanent information and control data)

area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

The present invention intends to provide a method of efficiently recording disc information (DI) as disc control information required for record playback of a disc in the prerecorded or recordable area. It is apparent that a recording method in the prerecorded area is differently applied to each kind of discs. In case of BD-RE/WO, the PIC area as the prerecorded area is recorded by biphased high frequency modulated signals, the high frequency modulated signals in the corresponding area are played back according to a specific playback method, and information is acquired from the playback.

FIG. 2 is a diagram of a dual-layer disc having dual recording layers, in which a recording layer starting with a lead-in is named a first recording layer Layer0 and a recording layer ending with a lead-out is named a second recording layer Layer1.

In the dual-layer disc, the PIC area is provided to lead-in and lead-out areas of a disc inner circumference area, and disc information (DI) of the same contents is recorded in the PIC area.

Figure 3:
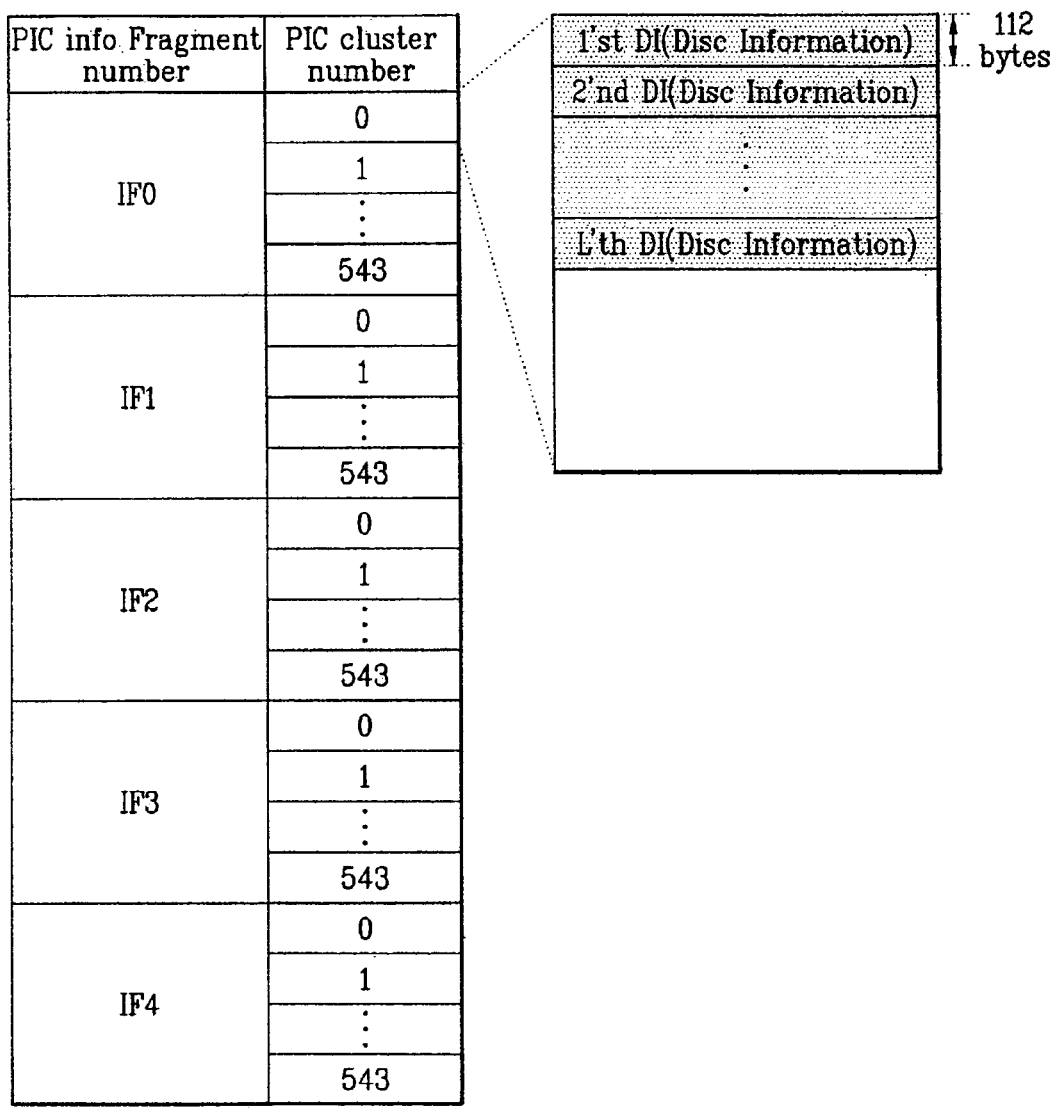
FIG. 3 is a diagram of a management area where disc control information of the present invention is recorded, illustrating a disc information recording format.

FIG. 3 is a structural diagram of a PIC area in the disc shown in FIG. 1 or FIG. 2. As mentioned in the foregoing description, it means that information can be rearranged like the structure of the PIC area in FIG. 3 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IFO. The disc information is plurally recorded per recording layer and writing speed permitted by the corresponding optical disc, and one disc information includes one hundred twelve bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Hence, such information is utilized in record playback of the corresponding optical disc, thereby enabling to provide optimal recording power per recording layer and per writing speed.

Namely, the disc information (DI) of the present invention is characterized in providing specific writing speed information supported by the corresponding disc and associated write strategy information, and more specifically, in providing specific writing speed supported for each recording layer and associated write strategy information via a specified method in case that a plurality of recording layers exist in the corresponding disc.

And, the specific configuration of the disc information (DI) relates to that of Blu-ray disc (BD). It is also apparent that a DVD based disc may have a configuration different from the above-explained structure. Specifically, if a size of disc information (DI) corresponds to that of BD, it is 112 bytes equivalently for example. Yet, by regarding disc information (DI) of the same recording layer as one information to provide once without repeating common information, it may be able to configure the write strategy differing per writing speed only in addition.

Various embodiments for a method of configuring disc information and a method of recording specific information and the like within disc information according to the present invention are explained in detail by referring to the attached drawings as follows.

FIGS. 4 to 7C are diagrams for a method of recording disc information of an optical disc according to a first embodiment of the present invention, in which disc information is configured per writing speed and in which disc information is configured in a specific sequence per recording layer within each corresponding writing speed.

FIG. 4 shows a concept of recording disc control information of an optical disc according to a first embodiment of the present invention.

Referring to FIG. 4, a sequence for disc information each is decided by a sequence number and is recorded by 1-byte. For instance, the information is recorded in a $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed and per recording layer and that a configuration sequence of a plurality of the separately provided disc informations is uniformly decided according to a predetermined manner.

For instance, if a corresponding optical disc includes a pair of recoding layers and four kinds of applicable writing speeds (e.g., 1× speed, 2× speed, 3× speed, and 4× speed) exist, disc information can be configured in a following manner.

'00h' of $1^{st}$ disc information is related to 1× speed and $1^{st}$ recording layer L0. '01h' of $2^{nd}$ disc information is related to 1× speed and $2^{nd}$ recording layer L1. '02h' of $3^{rd}$ disc information is related to 2× speed and $1^{st}$ recording layer L0. '03h' of $4^{th}$ disc information is related to 2× speed and $2^{nd}$ recording layer L1. '04h' of $5^{th}$ disc information is related to 3× speed and $1^{st}$ recording layer L0. '05h' of $6^{th}$ disc information is related to 3× speed and $2^{nd}$ recording layer L1. '06h' of $7^{th}$ disc information is related to 5× speed and $1^{st}$ recording layer L0. And, '07h' of $8^{th}$ disc information is related to 5× speed and $2^{nd}$ recording layer L1.

Namely, in configuring disc information, the present invention is characterized in that at least one disc information is configured per writing speed and the respective per writing speed disc informations are reconfigured per recording layer. Hence, the writing speed is preferred in the sequence of configuring the disc informations to a recording layer type.

FIG. 5A exemplarily shows a method of configuring disc information according the first embodiment of the present invention in FIG. 4, in which total sixteen disc informations are configured in case that four kinds of applicable writing speeds (e.g., 1×, 2×, 4×, and 6×) and four recording layers (L0, L1, L2, and L3) exist within a disc.

Referring to FIG. 5A, $1^{st}$ to $4^{th}$ disc informations 00h to 03h become disc information for 1× speed, $5^{th}$ to $8^{th}$ disc informations 04h to 07h become disc information for 2× speed, $9^{th}$ to $12^{th}$ disc informations 08h to 11h become disc information for 4× speed, and $13^{th}$ to $16^{th}$ disc informations 02h to 15h become disc information for 6× speed.

And, per writing speed disc informations come into configuring separate disc informations per recording layer to define as follows. Namely, '00h', '04h', '08h', and '12h' mean disc informations for $1^{st}$ recording layer L0 at corresponding writing speeds, respectively. '01h', '05h', '09h', and '13h' mean disc informations for $2^{nd}$ recording layer L1 at corresponding writing speeds, respectively. '02h', '06h', '10h', and '14h' mean disc informations for $3^{rd}$ recording layer L2 at corresponding writing speeds, respectively. And, '03h', '07h', '11h', and '15h' mean disc informations for $4^{th}$ recording layer L3 at corresponding writing speeds, respectively.

FIG. 5B exemplarily shows a method of configuring disc information according the first embodiment of the present invention in FIG. 4, in which total eight disc informations are configured in case that four kinds of applicable writing speeds (e.g., 1×, 2×, 4×, and 6×) and two recording layers (L0, L1) exist within a disc.

The disc information configuring method in FIG. 5B is as good as that in FIG. 5A. First of al, per writing speed disc informations are preferentially configured and then reconfigured per recording layer.

Figure 6B:
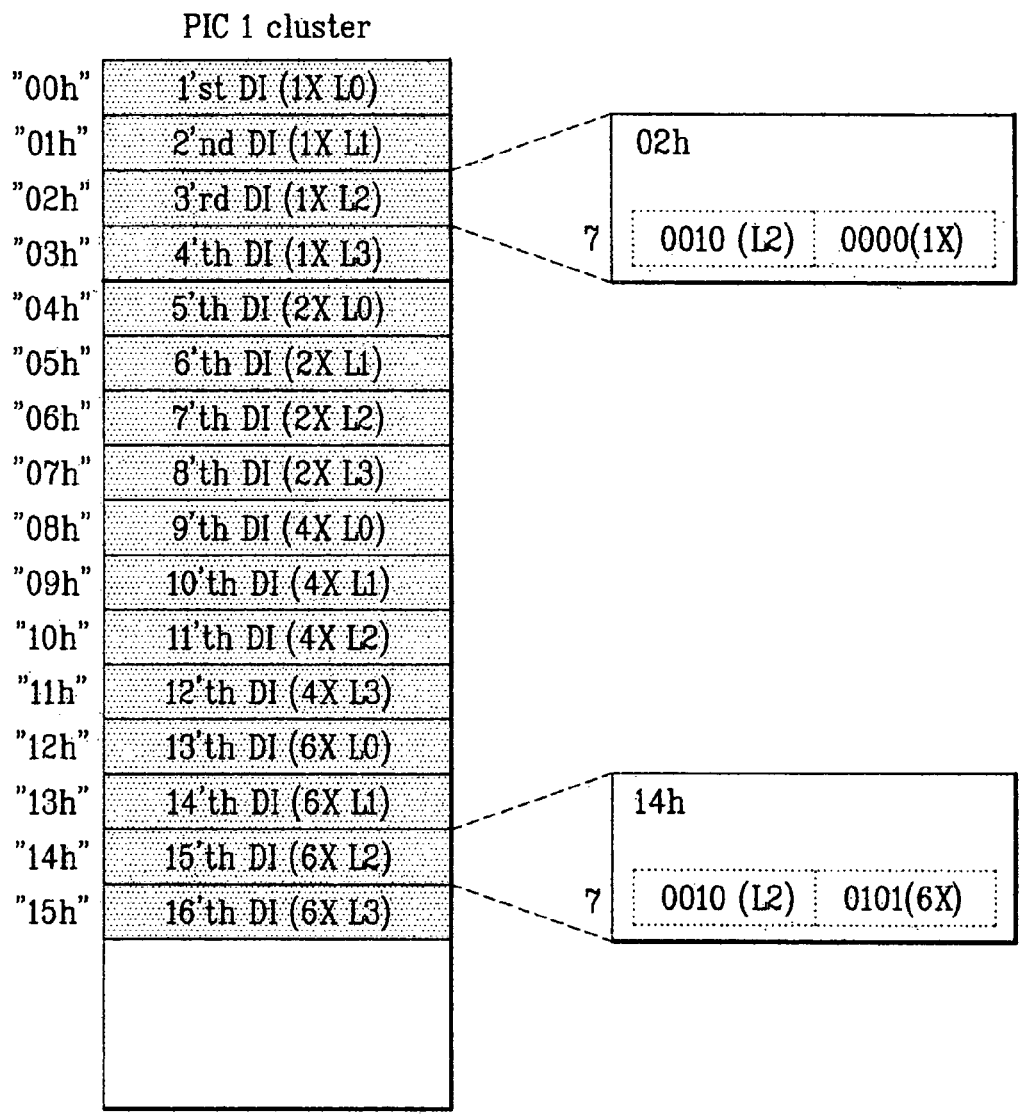

FIG. 6A and FIG. 6B are exemplary diagrams of recording the disc control information according to the first embodiment of the present invention, in which intrinsic 'recording layer information' and 'writing speed information' are recorded within disc information.

Referring to FIG. 6A, 'DI frame sequence number in DI block' is provided to $5^{th}$ byte of each disc information to mean a sequence, which means that disc informations are configured in a specific sequence in the same manner of FIG. 4. Besides, recording layer information and recording velocity information to be used for corresponding disc information are represented by specific bits to be provided to a specific area, e.g., $7^{th}$ byte, within the corresponding disc information each. For instance, the recording layer information and the recording velocity information are recorded in upper and lower 4-bits of the $7^{th}$ byte, respectively.

The recording layer information is defined as follows. First of all, '0000b' of the recording layer information means $1^{st}$ recording layer L0. '001b' of the recording layer information means $2^{nd}$ recording layer L1. And, '1111b' of the recording layer information means $16^{th}$ recording layer L15.

Meanwhile, the recording velocity information enables to define 4-bits in various ways as follows. Namely, '0000b', '0001b', '0111b', '0111b', and '1111b' are defined to mean 1× speed, 2× speed, 4× speed, 8× speed, and 16× speed, respectively.

Hence, the above-manners of defining the recording layer information and the recording velocity information can be defined in various ways via specification establishment. For example, the recording layer or velocity information can be defined by allocating 1-byte thereto.

Thus, the intrinsic recording layer and velocity informations corresponding to its sequence number, as shown in FIG. 6A, are recorded in a previously promised specific location ($7^{th}$ byte), whereby it is facilitated to confirm the recording layer and velocity informations of the corresponding disc information. And, write power or write parameters fitting the recording layer and velocity are recorded in detail using $P^{th}$~$111^{th}$ bytes, thereby enabling efficient record playback using the informations.

FIG. 6B shows an example of disc information including its intrinsic recording layer information and recording velocity information, in which total sixteen disc informations are configured in case that four kinds of applicable writing speeds (e.g., 1×, 2×, 4×, and 6×) and four recording layers (L0, L1, L2, and L3) exist within a disc.

The detailed configuring method of the disc information is the same in FIG. 5A. Considering the example in FIG. 6A, each of the disc informations includes its intrinsic recording layer information and recording velocity information. For instance, upper 4-bits of $7^{th}$ byte within '02h' of $3^{rd}$ disc information is set to '0010' to indicate $3^{rd}$ recording layer L2 and lower 4-bits thereof is set to '0000' to indicate 1× speed, whereby it can be apparently represented that the corresponding disc information relates to 1× speed and $3^{rd}$ recording layer.

For another instance, upper 4-bits of $7^{th}$ byte within '14h' of $15^{th}$ disc information is set to '0010' to indicate $3^{rd}$ recording layer L2 and lower 4-bits thereof is set to '0101' to indicate 1× speed, whereby it can be apparently represented that the corresponding disc information relates to 6× speed and $3^{rd}$ recording layer.

Figure 7A:
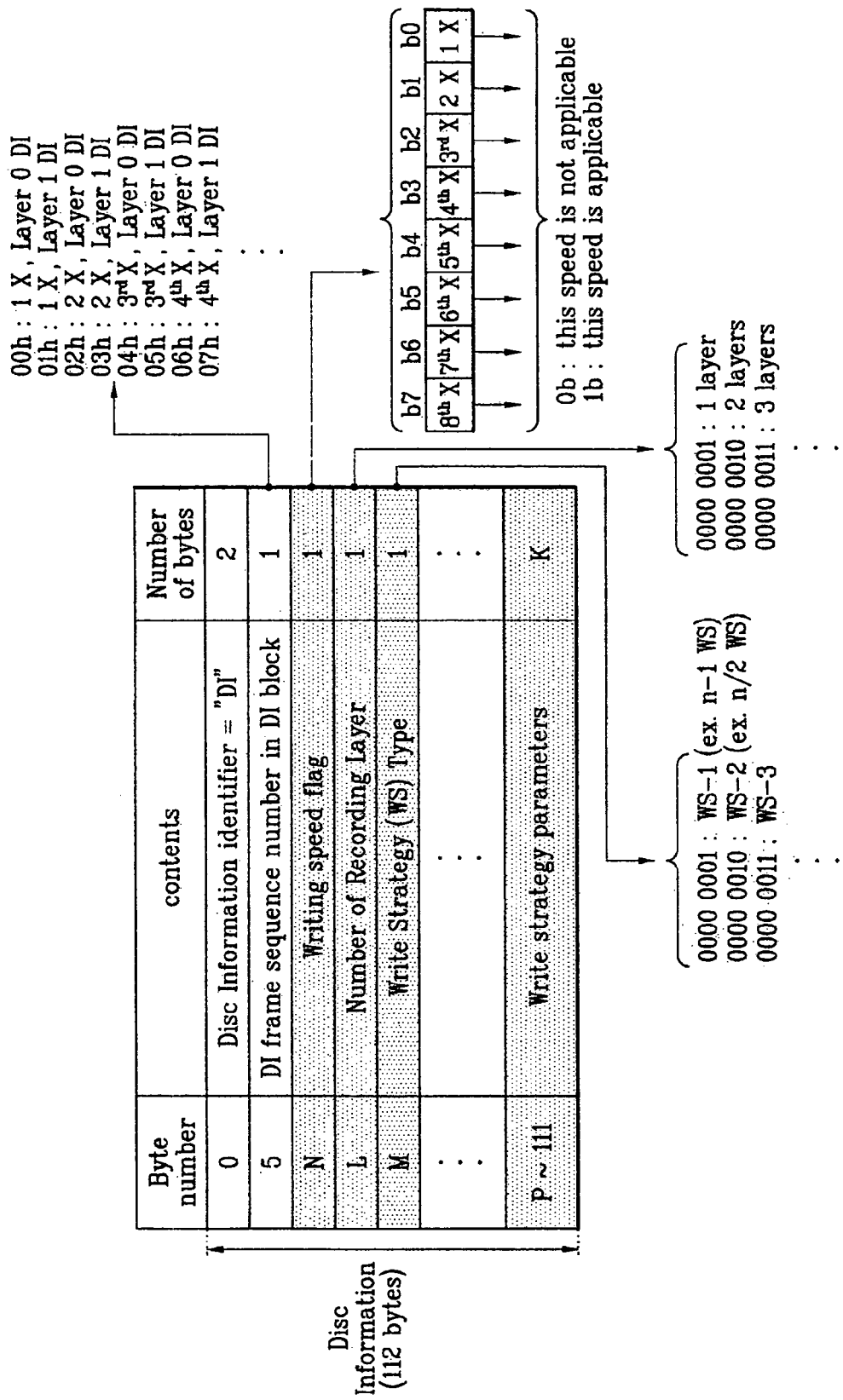
Figure 7B:
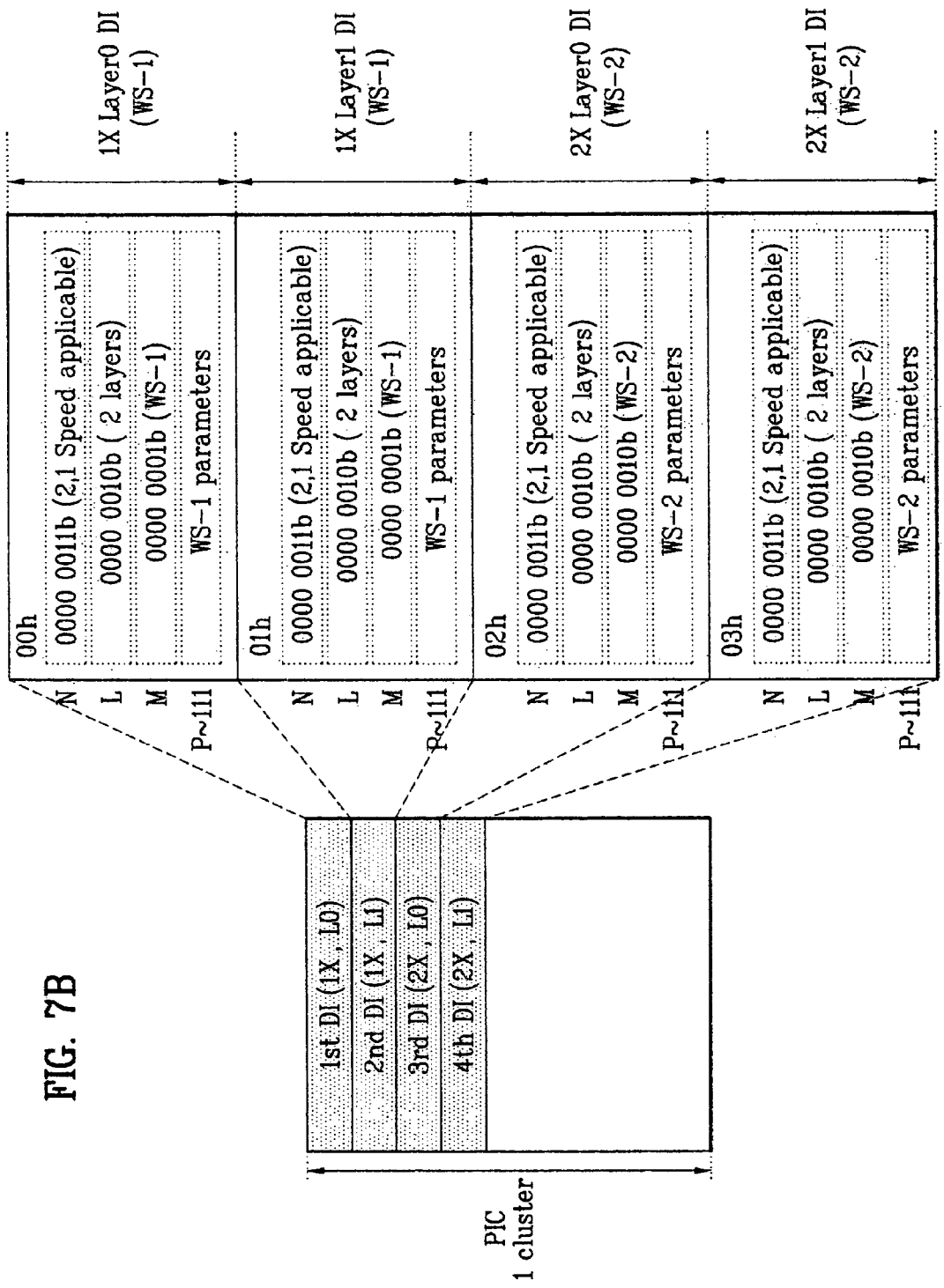

FIGS. 7A to 7C are diagrams of an another example of recording disc information according to the first embodiment of the present invention, in which 'disc-applicable writing speed information' and 'recording layer information existing within disc' are commonly recorded within the corresponding disc.

Referring to FIG. 7A, 'DI frame sequence number in DI block' is provided to $5^{th}$ byte of each disc information to mean a sequence, which means that disc informations are configured in a specific sequence in the same manner of FIG. 4. Besides, writing speed information applicable by a corresponding disc is recorded within a specific area ($N^{th}$ byte) within disc, which is named 'Writing speed flag' field.

For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed. For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}$×, $4^{th}$×, $5^{th}$×, $6^{th}$×, $7^{th}$×, $8^{th}$×) to 5×, 6×, 8×, 12×, 14×, and 16× speeds, respectively.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the rest area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified types by a disc manufacturer. Hence, if the corresponding disc information is a first type write strategy WS-1, '0000 0001' is written in the $M^{th}$ byte. If the corresponding disc information is a second type write strategy WS-2, '0000 0010' is written in the $M^{th}$ byte. And, substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. And, it is also possible to apply one specified write strategy (WS) type in 1× speed disc information, which is expected to be supported by every record playback apparatus (FIG. 10), in a mandatory manner.

The detailed recording method of the write strategy (WS) is not a major concern of the present invention. Yet, in brief, a medium property of a recording layer is generally modified by applying a laser beam to the recording layer within an optical disc via a pickup ('11' in FIG. 10) to perform a recording thereof. Hence, it should be decided a strength (write power) of the laser beam, a time of applying the write power thereto, and the like. The above-decided various kinds of write strategies are named 'Write Strategy (WS)' in general and specific contents recorded within a specific 'Write Strategy (WS)' are named 'Write Strategy (WS) parameters'.

And, the write strategy (WS) can be recorded in various ways. As a disc becomes to be highly densified and to run at higher speed, a writing speed, i.e., disc RPM) as well as the medium property of the recording layer is considerably affected. Hence, a more accurate system is requested. And, the various write strategies (WS) are explained as follows for example.

First of all, there is a system having a recording pulse smaller by 1 than a recording mark size (n) formed on a recording layer medium, which may be called '(n−1) WS'. Secondly, there is a system having a recording pulse having a size amounting to a half of the recording mark size (n), which may be called 'n/2 WS'. Besides, new write strategies (WS) keep being developed. Regarding the different kinds of write strategy (WS), when there exist the various systems of the write strategy (WS) exist as parameters applied to the write strategies (WS) differ from each other, a disc manufacturer tests the recording power according to the write strategy (WS) recorded in the selected $M^{th}$ byte and then records a result of the test as write strategy (WS) in the Pth~$111^{th}$ bytes within the disc information.

From the above-recorded 'writing speed information' in the $N^{th}$ byte and the 'recording layer information' in the $L^{th}$ byte, the record playback apparatus (FIG. 10) recognizes how many disc informations exist within the corresponding disc. Namely, the number of the existing disc informations is found by multiplying an applicable writing speed number by the number of recording layers.

As the present invention applies one write strategy (WS) for a specific writing speed and a specific recording layer, the kind (type) and number of the write strategy (WS) may not be taken into consideration in deciding the number of disc information(s). Yet, in a second embodiment of the present invention, it will be described that a plurality of write strategies (WS) can exist for a specific writing speed and a specific recording layer. In such a case, the total number of the existing disc informations is not always found by multiplying an applicable writing speed number by the number of recording layers.

Hence, a sequence of a plurality of the above-decided disc informations is decided by the sequence numbers, which is written in the $5^{th}$ byte in the foregoing description, and each of the disc informations designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc informations are needed so that the sequence will be '00h~07h'. And, it is previously decided that disc informations of '00h', '01h', '02h', '03h', '04h', '05h', '06h', and '07h' relate to '1× speed, $1^{st}$ recording layer', '2× speed, $2^{nd}$ recording layer', '2× speed, $1^{st}$ recording layer', '2× speed, $2^{nd}$ recording layer', '$3^{rd}$ writing speed, $1^{st}$ recording layer', '$3^{rd}$ writing speed, $2^{nd}$ recording layer', '$4^{th}$ writing speed, $2^{nd}$ recording layer', and '$4^{th}$ writing speed, $2^{nd}$ recording layer', respectively.

Hence, in order to acquire the disc information for a specific target writing speed and a specific target recording layer, the record playback apparatus (FIG. 10) is facilitated to check which disc information is related to the specific target writing speed and recording layer from 'writing speed information' of the $N^{th}$ byte and 'recording layer information' of the $L^{th}$ byte commonly recorded within the respective disc informations instead of playing back to check the entire disc informations.

FIG. 7B shows an example of recording disc information according to the first embodiment of the present invention in FIG. 7A. It can be known that there are two (1×, 2×) applicable writing speeds from $N^{th}$ byte ('0000 0010b') commonly recorded in the entire disc informations and that two recording layers exist within a disc from $L^{th}$ byte ('0000 0010b').

Hence, in the example of FIG. 7B, total four disc informations (two recording layers*two writing speeds) exist and a sequence of the disc informations becomes '00h' (1×,L0) → '01h' (1×,L1) → '02h' (2×,L0) → '03h' (2×,L1). This is done by a specified content according to a predetermined sequence. Thus, the entire disc informations should be configured according to the above manner to enable reciprocal compatibility for utilization.

An intrinsic write strategy (WS) is recorded in other bytes within each disc information as well as $N^{th}$ and $L^{th}$ bytes. Specifically, information of a type of a write strategy (WS) written in $P^{th}$~$111^{th}$ bytes within the corresponding disc information is recorded in $M^{th}$ byte. Namely, informations in the $M^{th}$ and $P^{th}$~$111^{th}$ bytes can differ in each disc information.

In the example in FIG. 7B, '00h' (1×,L0) and '01h' (1×,L1) relate to the application of a first type write strategy (WS-1) and '02h' (2×,L0) and '03h' (2×,L1) relate to the application of a second type write strategy (WS-2).

FIG. 7C shows another example of recording disc information according to the first embodiment of the present invention in FIG. 7A. It can be known that there are eight (1×, 2×, ..., 16×) applicable writing speeds from $N^{th}$ byte ('1111

1111b') commonly recorded in the entire disc informations and that four recording layers exist within a disc from $L^{th}$ byte ('0000 0100b').

Hence, in the another example of FIG. 7C, total thirty-two disc informations (four recording layers*eight writing speeds) exist and a sequence of the disc informations becomes '00h' (1×,L0) → '01h' (1×,L1) → '02h' (1×,L2) → '03h' (1×,L4) → '04h' (2×,L0) → . . . →'31h' (16×,L4). This is done by a specified content according to a predetermined sequence. Thus, the entire disc informations should be configured according to the above manner to enable reciprocal compatibility for utilization.

An intrinsic write strategy (WS) is recorded in other bytes within each disc information as well as $N^{th}$ and $L^{th}$ bytes. Specifically, information of a type of a write strategy (WS) written in $P^{th}$~$111^{th}$ bytes within the corresponding disc information is recorded in $M^{th}$ byte. Namely, informations in the $M^{th}$ and $P^{th}$~$111^{th}$ bytes can differ in each disc information.

In the another example of FIG. 7C, if a record playback unit (FIG. 10) intends to search disc information related to 2× speed (2×,L0) of a first recording layer to perform recording by applying a write strategy (WS) within the corresponding disc information, it can be known from the informations in the $N^{th}$ and $L^{th}$ bytes commonly recorded in the entire disc informations that total thirty-two disc informations (four recording layers*eight writing speeds) exist in the corresponding disc according to the sequence of the disc informations such as '00h' (1×,L0) → '01h' (1×,L1) → '02h' (1×,L2) → '03h' (1×,L4) → '04h' (2×,L0) → . . . →'31h' (16×,L4), Hence, the record playback apparatus (FIG. 10) enables to recognize that the disc information related to the 2× speed (2×,L0) of the first recording layer to be searched is '04h' and that the corresponding disc information ('04h') is recorded as the first type write strategy (WS-1) from the write strategy (WS) type identification information ('0000 0001b') recorded in the $M^{th}$ byte within the corresponding information ('04h'), thereby reading out parameter values of the first type write strategy (WS-1) via the $P^{th}$~$111^{th}$ bytes to utilize in the recording.

Likewise, if intending to search disc information related to 16× speed (16×,L3) of a fourth recording layer to perform recording by applying a write strategy (WS) within the corresponding disc information, the record playback unit (FIG. 10) recognizes that the corresponding disc information is '31h' via the same process and that the write strategy type (WS) is the second type (WS-2), thereby enabling to utilize them in the recording.

Figure 8:
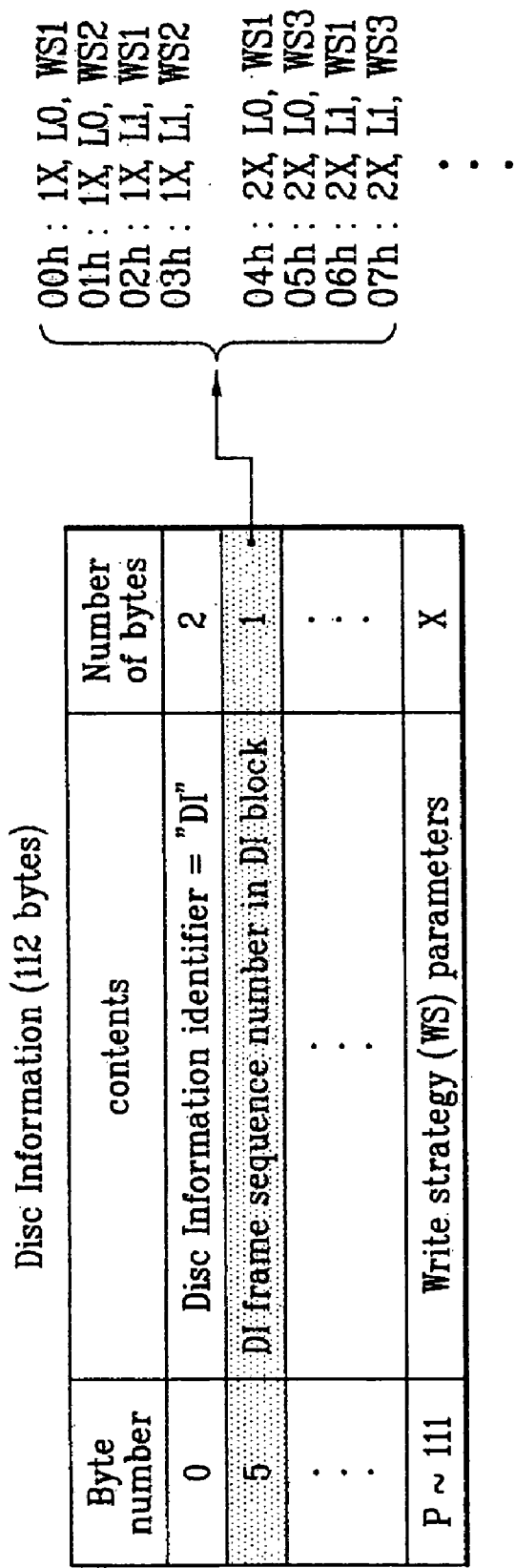
FIG. 8 is a diagram of a sample data structure of disc control information recorded according to a second embodiment of the present invention.
Figure 9A:
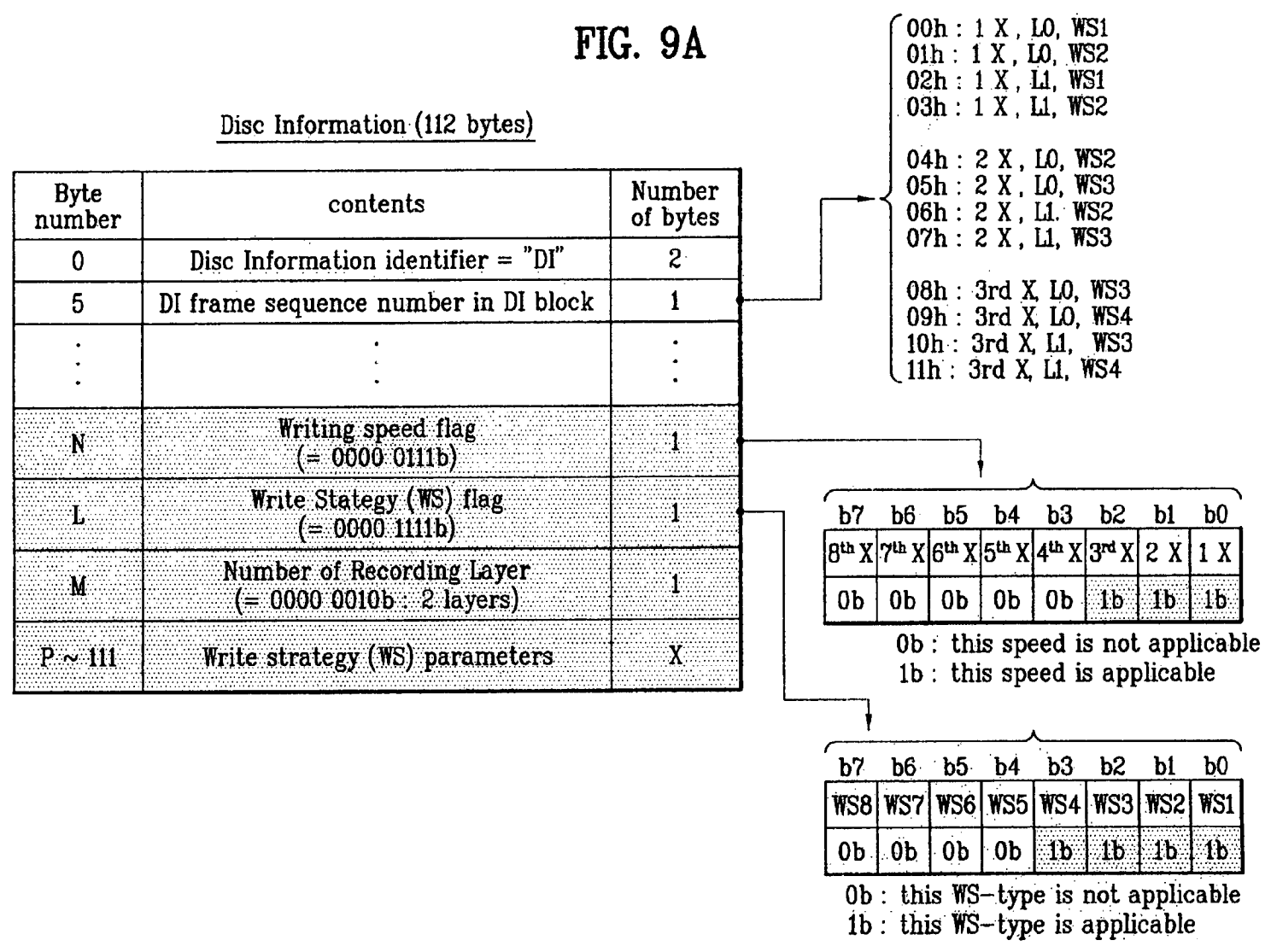
Figure 9B:
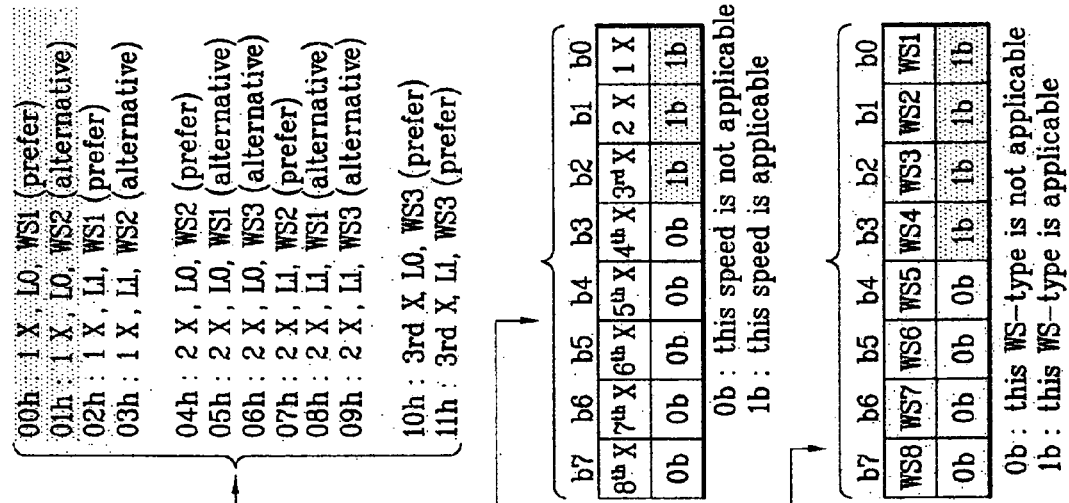

FIGS. 8 to 9B shows a method of recording dist information of an optical disc according to a second embodiment of the present invention, which is extended from the first embodiment of the present invention in FIG. 4. The second embodiment of the present invention is characterized in that disc information is configured per writing speed, disc information is configured per recording layer within the corresponding writing speed, and at least one write strategy (WS) is configured for each disc information per corresponding recording layer.

FIG. 8 shows a concept of the method of recording disc information of the optical disc according to the second embodiment of the present invention.

Referring to FIG. 8, a sequence for disc information each is decided by a sequence number and is recorded by 1-byte.

For instance, the information is recorded in a $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed and per recording layer and that a configuration sequence of a plurality of the separately provided disc informations is uniformly decided according to a predetermined manner.

For instance, if a corresponding optical disc includes a pair of recoding layers and plural kinds of applicable writing speeds exist, disc information can be configured in a following manner.

'00h' of $1^{st}$ disc information is related to 1× speed, $1^{st}$ recording layer L0, and WS1. '01h' of $2^{nd}$ disc information is related to 1× speed, $1^{st}$ recording layer L0, and WS2. '02h' of $3^{rd}$ disc information is related to 1× speed, $2^{nd}$ recording layer L1, and WS1. '03h' of $4^{th}$ disc information is related to 1× speed, $2^{nd}$ recording layer L1, and WS2. '04h' of $5^{th}$ disc information is related to 2× speed, $1^{st}$ recording layer L0, and WS1. '05h' of $6^{th}$ disc information is related to 2× speed and $1^{st}$ recording layer L0, and WS3. '06h' of $7^{th}$ disc information is related to 2× speed, $2^{nd}$ recording layer L1, and WS1. And, '07h' of $8^{th}$ disc information is related to 2× speed, $2^{nd}$ recording layer L1, and WS3.

Namely, in configuring disc information, the second embodiment according to the s present invention is characterized in that at least one disc information is configured per writing speed, the respective per writing speed disc informations are reconfigured per recording layer, and at least one WS type is provided to each recording layer.

Hence, the writing speed, the recording layer, and the WS type are taken into consideration in order of priority in configuring the disc informations.

FIG. 9A exemplarily shows a method of configuring disc information according the second embodiment of the present invention in FIG. 8, in which total sixteen disc informations are configured in case that four kinds of applicable writing speeds (e.g., 1×, 2×, 4×, and 6×) and four recording layers (L0, L1, L2, and L3) exist within a disc.

Referring to FIG. 9A, 'DI frame sequence number in DI block' is provided to $5^{th}$ byte of each disc information to mean a sequence, which means that disc informations are configured in a specific order (writing speed → recording layer → WS type) of priority in FIG. 8. Besides, writing speed information applicable by a corresponding disc is recorded within a specific area ($N^{th}$ byte) within disc, which is named 'Writing speed flag' field. For instance, whether a specific writing speed of eight kinds of writing speeds is applicable by the corresponding disc is represented by 1-bit each in the same area having 1-byte allocated thereto.

Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed. For instance, if 1× speed is applicable by a corresponding disc only, '0000 0001' is written in $N^{th}$ byte. If all of the eight kinds of writing speeds are applicable, '1111 1111' is written in the $N^{th}$ byte. In the drawing, '0000 0111b' is written in the $N^{th}$ byte to allow $1^{st}$ to $3^{rd}$ writing speeds.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}\times$, $4^{th}\times$, $5^{th}\times$, $6^{th}\times$, $7^{th}\times$, $8^{th}\times$) to 4×, 6×, 8×, 12×, 14×, and 16× speeds, respectively.

And, information of informing a kind of write strategy (WS) applicable by a specification of a corresponding disc is recorded in another specific area ($L^{th}$ byte) within the disc information, which is named 'Write Strategy (WS) flag' field. For instance, whether a specific write strategy (WS) of eight kinds of write strategies (WS) is applicable by the corresponding disc is represented by 1-bit each in the same area having 1-byte allocated thereto. Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating applicability of a specific write strategy (WS). For instance, if $1^{st}$ to $3^{rd}$ type write strategies WS1 to WS3 are applicable by a corresponding disc only, '0000 0111b' is written in $L^{th}$ byte. If all of the eight types of write strategies (WS1 to WS8) are applicable, '1111 1111b' is written in the $L^{th}$ byte. In the drawing, '0000 1111b' is written in the $L^{th}$ byte to indicate that four WS types WS1 to WS4 are applicable.

Moreover, recording layer information indicating the number of recording layer(s) existing within the corresponding disc is recorded in another specific area ($M^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer (one recoding layer) in FIG. 1, '0000 0001b' is written in the $M^{th}$ byte. In case that the recording layer is the dual layer (two recording layers) in FIG. 2, '0000 0010b' is written in the $M^{th}$ byte. In case that four recording layers exist, '0000 0100b' is written in the $M^{th}$ byte.

Besides, parameters of a selected write strategy (WS) are written in another specific area ($P^{th}$~$111^{th}$ bytes) within the disc information, which is named 'Write Strategy (WS) parameters' field.

By writing the $N^{th}$, $L^{th}$, and $M^{th}$ byte informations recorded within the disc information by the same values in common to the entire disc informations, respectively, the record playback apparatus (FIG. 10) is facilitated to acquire the informations of the writing speed applicable by the corresponding disc, the write strategy (WS) kind, and the number of the recording layers despite playing back any disc information.

Specifically, it may be able to record disc information per writing speed, per recording layer, and per write strategy (WS) type. Yet, in such a case, the number of the recorded disc informations excessively increases. Moreover, a disc manufacturer should test the entire write strategy (WS) types and record the test results within the disc information, whereby it becomes a burden.

Therefore, in the embodiment according to the present invention, write strategies (WS) of which number (m) is smaller than that (n) of the maximum applicable write strategy types are recordable within disc information and a disc manufacturer further enables to optionally record a specific one of a plurality of write strategies (WS), whereby disc manufacturer's convenience is secured as well as an efficient recording of disc information is enabled.

In FIG. 9A, recording is performed at 1× speed (1×) using $1^{st}$ and $2^{nd}$ type write strategies WS1 and WS2, at 2× speed (2×) using $2^{nd}$ and $3^{rd}$ type write strategies WS2 and WS3, or at $3^{rd}$ writing speed (3×) using $3^{rd}$ and $4^{th}$ type write strategies WS3 and WS4.

Namely, it is able to record disc information using write strategy (WS) types (two types) less than total applicable write strategy (WS) types (four types) per writing speed.

FIG. 9B shows another example of recording disc information according to the second embodiment of the present invention in FIG. 8. Like FIG. 9A, three kinds of applicable writing speeds exist and '0000 0111b' is written in $N^{th}$ byte. Four applicable write strategy types exist and '0000 1111b' is written in $L^{th}$ byte. And, two recording layers exist within a disc and '0000 0010b' is written in $M^{th}$ byte.

Specifically, in configuring disc information using one of a plurality of applicable write strategies (WS), at least one disc information is configured per the same writing speed and recording layer. In doing so, the most preferentially provided disc information is defined as preferred WS provided by a disc manufacturer and another disc information following the preferred WS is defined as alternative WS.

Namely, both disc information '00h' and disc information '01h' relate to 1× speed (1×) and $1^{st}$ recording layer (L0). Yet, the WS1 type information recorded in '00h' as preferentially provided disc information becomes the preferred WS and the WS1 type information recorded in '01h' as a next provided one becomes the alternative WS.

And, disc information '04h', disc information '05h', and disc information '06h' relate to 2× speed (2×) and $1^{st}$ recording layer (L0). Yet, the WS2 type information recorded in '04h' as preferentially provided disc information becomes the preferred WS, and the WS1 type information recorded in '05h' and the WS3 type information recorded in '06h' as next provided ones become the alternative WSs, respectively. Namely, they can be applied to at least three disc informations of the same writing speed/recording layer.

Moreover, disc information '10h' relates to $3^{rd}$ speed ($3^{rd}\times$) and $1^{st}$ recording layer (L0) and disc information '11h' relates to $3^{rd}$ speed ($3^{rd}\times$) and $2^{nd}$ recording layer (L0). In case that only one WS type information is provided to the same writing speed/recording layer, the provided WS becomes the preferred WS.

Namely, when a disc manufacturer provides disc information within a disc according to the previously determined specification, an optical record playback apparatus (FIG. 10) reads out the disc information in a specific order (writing speed → recording layer). If a plurality of disc informations exist on the same writing speed/recording layer, the optical record playback apparatus (FIG. 10) recognizes the preferentially provided WS within the disc information as the preferred WS and the next WS as the alternative WS additionally provided by a disc manufacturer, thereby enabling record playback using disc information efficiently.

Figure 10:
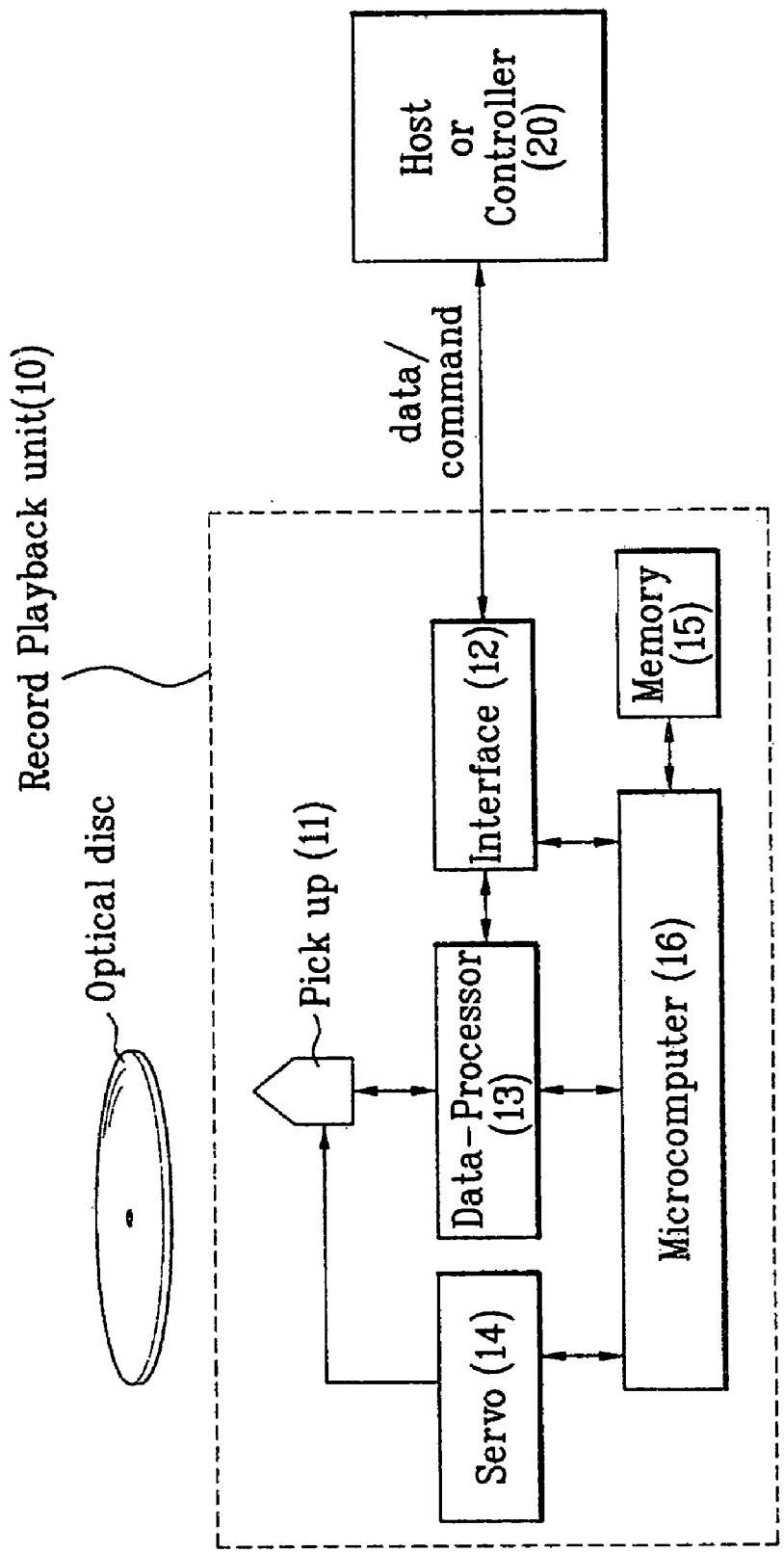
FIG. 10 is a block diagram of an optical disc recording and reproducing apparatus according to the present invention.

FIG. 10 is a block diagram of an optical disc record playback according to the present invention.

Referring to FIG. 10, a record playback apparatus according to the present invention includes a record playback unit 10 carrying out record playback on an optical disc and a control unit 20 controlling the record playback unit 10.

The control unit 20 gives a record or playback command for a specific area, and the record playback unit 10 caries out the record/playback for the specific area according to the command of the control unit 20. Specifically, the record playback unit 10 includes an interface unit 12 performing communications with an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10.

A recording process of an optical disc according to the present invention is explained in detail as follows.

First of all, once an optical disc is loaded in the optical record playback apparatus, the entire disc management information within the disc is read out to be temporarily stored in the memory 15 of the record playback unit 10. And, various kinds of the disc management information are utilized for the record/playback of the optical disc. Specifically, the management information stored in the memory 15 includes disc control information of the present invention. Hence, the recording layer information, writing speed information, and write strategy fitting the corresponding writing speed recorded within the disc information are read out to be stored in the memory.

If intending to perform a recording on a specific area within the optical disc, the control unit 20 renders such an intent into a writing command and then delivers it to the record playback unit 10 together with data for writing location information to be recorded. After receiving the writing command, the microcomputer 16 decides the corresponding writing speed applied to an intended recording layer within the optical disc from the management informations stored in the memory 15 and then performs the writing command using the optimal write strategy by referring to the decided writing speed.

Specifically, in case that the recording is performed on the optical disc by the present invention, the disc information as management information is provided in a specific order and the microcomputer 16 recognizes which WS is the preferred WS of the disc manufacturer in the same writing speed/ recording layer. Therefore, it is more facilitated to perform the recording on a specific recoding layer within an optical disc at a specific writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer-readable medium comprising:
   at least two recording layers provided with a recordable area, and at least one of the two recording layers including a control data area, the control area storing information units, each information unit including a writing strategy corresponding to a writing speed and the information units being provided in a specific order within the control data area by being firstly arranged in a writing speed order, being subsequently arranged by recording layer for information units having a same writing speed, and being further arranged in a write strategy order by preferred write strategy to alternative write strategy for information units having the same writing speed and the same recording layer; and
   wherein each information unit includes information indicating the corresponding writing speed and the corresponding recording layer.

2. The computer-readable medium as claimed in claim 1, wherein the computer-readable medium is a recordable Blu-ray disc.

3. The computer-readable medium as claimed in claim 1, wherein at least one information unit is provided for the same writing speed and wherein, if a plurality of information units are provided for the same writing speed, the information unit for a preferred write strategy is followed by the information unit for an alternative write strategy.

4. The computer-readable medium as claimed in claim 3, wherein each information unit includes write parameters for the write strategy.

5. The computer-readable medium as claimed in claim 4, wherein each information unit includes a sequence number in the sequential order.

6. The computer-readable medium as claimed in claim 1, wherein each information unit includes information indicating a type of write strategy.

7. The computer-readable medium as claimed in claim 6, wherein each information unit includes information indicating a preferred write strategy.

8. A method for recording data on a recording medium having at least two recording layers, comprising:
   determining a specific write speed and write strategy for a one of the recording layers from control information recorded on one of the recording layers, the control information including a plurality of information units having a sequential order, each information unit including recording layer information; and
   recording data on the recording layer at the specific writing speed by using write parameters for the write strategy included in the information unit for the specific write speed and write strategy,
   wherein the sequential order of information units is by order of increasing writing speed, and for a same writing speed the sequential order of information units is by recording layer, and for the same writing speed and a same recording layer, the sequential order of information units is by type of preferred write strategy to alternative write strategy.

9. A method of recording data on a recording medium including at least two recording layers, the method comprising:
   reading control information including information units, the information units including writing strategy for a plurality of writing speeds applicable to a specific recording layer of the recording medium, each information unit including recording layer information; and
   recording data on a specific recording layer based on at least one information unit,
   wherein the information units are arranged in a sequential order, the sequential order of information units being by order of increasing writing speed, and for a same writing speed the sequential order of information units being by recording layer, and for the same writing speed and a same recording layer, the sequential order of information units is by type of preferred write strategy to alternative write strategy.

10. An apparatus for recording or reproducing data on or from a recording medium having at least two recording layers, comprising:
    an optical pickup configured to record or read data on or from the recording medium, and
    a controller configured to identify a specific write speed and write strategy for a one of the recording layers based on control information, the control information including a plurality of information units having a sequential order and the controller configured to control a recording of data based on at least one information unit, wherein the sequential order of information units is by order of increasing writing speed, and for a same writing speed the sequential order of information units is by recording layer, and for the same writing speed and a same recording layer, the sequential order of information units is by type of preferred write strategy to alternative write strategy; and wherein each information unit includes recording layer information.

11. The computer-readable medium as claimed in claim 1, wherein each information unit includes an identifier identifying the write strategy type.

12. The apparatus of claim 10, wherein
each information unit includes a write strategy identifier indicating write strategy type, the write strategy type is one of n−1 write strategy and n−2 write strategy, and the controller is configured to identify the write strategy type and control the optical pickup to record the data based on the identified write strategy type.

13. The apparatus of claim 12, wherein the recording layer information comprises first recording layer information indicating total number of recording layers and second recording layer information indicating a corresponding one of the recording layers where the disc control information applies and the controller is configured to control the optical pickup to record the data on one of the recording layers of the recording medium based on the recording layer information.

14. The apparatus of claim 13, wherein each information unit further includes sequence number information indicating a sequence of the information unit among the plurality of information units included in the control information.

15. The apparatus of claim 14, wherein the each information unit further includes writing speed information indicating a corresponding writing speed where write strategy parameters included in the control information applies and controller is configured to control the optical pickup to record the data on the recording medium at the corresponding writing speed by using the write strategy parameters.

16. An apparatus for recording or reproducing data on or from a recording medium having at least two recording layers, comprising:
a memory configured to store a plurality of disc control information, each disc control information including a write strategy and recording layer information, and the plurality of the disc control information being arranged in a writing speed order and subsequently by recording layer for a same writing speed, and further in a write strategy order by preferred write strategy to alternative write strategy at the same writing speed and a same recording layer;
an optical pickup configured to read or write data from or on the recording medium; and
a controller, operatively coupled to the memory and the optical pickup, configured to identify the disc control information stored in the memory and control the optical pickup to record the data on the recording medium by using the disc control information.

17. The apparatus of claim 16, wherein each disc control information further includes a write strategy type identifier indicating write strategy type and the write strategy type is one of n−1 write strategy and n−2 write strategy and the controller is configured to identify the write strategy type and control the optical pickup to record the data based on the identified write strategy type.

18. The apparatus of claim 17, wherein the recording layer information indicates a total number of the recording layers and indicates a corresponding one of the recording layers where the disc control information applies, and the controller is configured to control the optical pickup to record the data on one of the recording layers of the recording medium based on the recording layer information.

19. The apparatus of claim 18, wherein each disc control information further includes sequence number information indicating a sequence of the disc control information among the plurality of disc control information included in the control information.

20. The apparatus of claim 19, wherein the each disc control information further includes recording speed information indicating a corresponding recording speed where write strategy parameters included in the disc control information applies and controller is configured to control the optical pickup to record the data on the recording medium at the corresponding recording speed by using the write strategy parameters.

21. A computer-readable medium comprising:
a specific area of the computer-readable medium storing control information for controlling recording of data on more than one layer of the computer-readable medium, the control information including information units in sequential order, each information unit including write strategy parameters usable at a recording speed applicable to the computer-readable medium, each information unit including recording layer information, the sequential order of information units being by order of recording speed, and for a same recording speed, the sequential order of information units being by order of recording layer, and for the same recording speed and recording layer, the sequential order of information units being by order of preferred write strategy to alternative write strategy.

22. The computer-readable medium of claim 21, wherein
the sequential order of information units by recording speed is by order of increasing recording speed;
the sequential order of information units by recording layer is by order of ascending recording layer number; and
the sequential order of information units by order of write strategy is by order of preference of the write strategy.

23. The computer-readable medium of claim 22, wherein the control information is recorded in a pre-recorded area of the computer-readable medium.

24. The computer-readable medium of claim 23, wherein the pre-recorded area is a sub-area of a lead-in area or lead-out area.

25. The computer-readable medium of claim 24, wherein the sub-area of the lead-in or lead-out area is a permanent information and control data (PIC) zone of the lead-in area or the lead-out area disclosed in Blu-ray disc.

26. The computer-readable medium of claim 24, wherein each information unit further includes a write strategy type identifier indicating write strategy type and the write strategy type is one of n−1 write strategy and n/2 write strategy.

27. The computer-readable medium of claim 26, wherein the recording layer information indicates total number of the recording layers and indicates a corresponding one of recording layers where the information unit applies.

28. The computer-readable medium of claim 27, wherein each information unit further includes sequence number information indicating a sequence of the information unit among the information units included in the control information.

29. The computer-readable medium of claim 28, wherein the each information unit further includes recording speed information indicating a corresponding recording speed where the write strategy parameters included in the information unit applies.

30. The method of claim 8, wherein the control information is recorded In a pre-recorded area of the recording medium.

31. The method of claim 30, wherein the pre-recorded area is a sub-area of a lead-in area or lead-out area.

32. The method of claim 31, wherein the sub-area of the lead-in or lead-out area is a permanent information and control data (PIC) zone of the lead-in area or the lead-out area disclosed in Blu-ray disc.

33. The method of claim 31, wherein each information unit further includes a write strategy type identifier indicating write strategy type and the write strategy type is one of n−1 write strategy and n/2 write strategy.

34. The method of claim 33, wherein the recording layer information indicates total number of the recording layers and indicates a corresponding one of the recording layers where the information unit applies.

35. The method of claim 34, wherein each information unit further includes sequence number information indicating a sequence of the information unit among the plurality of information units included in the control information.

36. The method of claim 35, wherein the each information unit further includes writing speed information indicating a corresponding writing speed where the write strategy parameters included in the information unit applies.

37. The method of claim 9, wherein the control information is recorded in a pre-recorded area of the recording medium.

38. The method of claim 37, wherein the pre-recorded area is a sub-area of a lead-in area or lead-out area.

39. The method of claim 38, wherein the sub-area of the lead-in or lead-out area is a permanent information and control data (PIC) zone of the lead-in area or the lead-out area disclosed in Blu-ray disc.

40. The method of claim 38, wherein each information unit further includes a write strategy type identifier indicating write strategy type and the write strategy type is one of n−1 write strategy and n/2 write strategy.

41. The method of claim 40, wherein the recording layer information indicates total number of the recording layers and indicates a corresponding one of the recording layers where the information unit applies.

42. The method of claim 41, wherein each information unit further includes sequence number information indicating a sequence of the information unit among the information units included in the control information.

43. The method of claim 42, wherein the each information unit further includes writing speed information indicating a corresponding writing speed where the write strategy parameters included in the information unit applies.

* * * * *